United States Patent [19]

Mayes

[11] 4,338,096
[45] Jul. 6, 1982

[54] METHOD AND APPARATUS FOR CONTROLLING THE FLOW OF MOLTEN REACTION MEDIA

[75] Inventor: Warden W. Mayes, Dallas, Tex.
[73] Assignee: Cosden Technology, Inc., Dallas, Tex.
[21] Appl. No.: 193,981
[22] Filed: Oct. 6, 1980
[51] Int. Cl.³ .......................... G05D 7/00; C10G 45/72
[52] U.S. Cl. .................................... 23/230 A; 422/62; 422/110
[58] Field of Search ...................... 23/230 A, 230 PC; 422/62, 78, 110; 48/197 R; 75/60

[56] References Cited

U.S. PATENT DOCUMENTS

| | | |
|---|---|---|
| 2,055,313 | 9/1936 | Ruthruff . |
| 3,520,657 | 7/1970 | Frumerman .................... 422/78 X |
| 3,553,279 | 1/1971 | Bawa . |
| 3,852,188 | 12/1974 | Dugan et al. . |
| 4,017,271 | 4/1977 | Barclay ............................ 48/197 R |

*Primary Examiner*—Ronald E. Serwin

[57] ABSTRACT

Method and apparatus for controlling the flow of a molten mass reaction medium into a reaction zone, said method comprising introducing the molten mass medium and a control gas into an elongated, vertical supply conduit leading to the reaction zone whereby the control gas exerts a gas-lift effect on the molten medium and apportioning the flow of control gas to the desired flow of molten medium; said apparatus comprising a reaction zone, supply conduit means for supplying a molten mass reaction medium to said reaction zone, and means for controllably introducing a control gas into said supply conduit means for regulating the flow of said molten mass reaction medium therethrough.

86 Claims, 6 Drawing Figures

METHOD AND APPARATUS FOR CONTROLLING THE FLOW OF MOLTEN REACTION MEDIA

BACKGROUND OF THE INVENTION

1. Field of the Invention

This invention relates to molten mass reaction media. More particularly, this invention relates to control of the flow of a molten mass reaction medium through a reaction zone. Specifically, in its most preferred aspect, this invention relates to controlling the flow of a molten mass reaction medium through a reaction zone in co-current relation by means of reactant, product and/or diluent gases which exert a gas-lift effect on the molten mass medium.

2. Description of the Prior Art

The use of a molten mass as a reaction medium has been suggested for numerous types of chemical reactions. For example, see U.S. Pat. Nos. 2,031,987; 2,053,211; 2,055,313; 2,074,529; 2,100,823; 2,334,583; 2,354,355; 2,682,459; 3,081,256; 3,129,165; 3,210,268; 3,252,773; 3,252,774; 3,270,086; 3,309,419; 3,387,941; 3,440,164; 3,449,458; 3,505,018; 3,553,279; 3,567,412; 3,574,543; 3,586,733; 3,619,144; 3,637,895; 3,697,614; 3,708,270; 3,710,737; 3,740,193; 3,745,109; 3,758,673; 3,852,188; 3,862,025; 3,871,992; 3,876,527; 3,916,617; 3,933,127; 3,941,681; 3,948,759 and 4,017,271. Advantages of molten media include effective heat transfer, promotion of uniform contact between reactants, rapid achievement and maintenance of a high reaction zone temperature, promotion of fast reaction times and, in certain instances, the absorption of by-products.

The use of molten mass reaction media is not, however, without difficulties. For example, molten media are difficult to handle and especially to transport. Valves, pumps or other parts of the system which have moving parts in direct contact with the molten mass reaction medium pose particular problems. Even partial solidification of the medium may result in plugging or jamming of such devices. Moreover, constant exposure to the physical and chemical action of the medium may cause rapid deterioration of such devices. A further difficulty arising from the use of a molten mass reaction medium lies in the area of controlling the medium flow. In many instances, it is desirable to be able to control the flow of reaction medium independently of the flow of reactants, products and/or diluents through the system. Due to the high heat capacities and the viscosities of molten reaction media, adjustment of reaction conditions (temperature, reactant/reaction medium proportions, flow rates, etc.) may be difficult.

Flexible control may be achieved by appropriate hydraulic design of the system, but hydraulic flow adjustments are often too slow for proper control of reaction conditions. There is a need for a technique for making rapid molten mass reaction medium flow adjustments in order to achieve optimum process control. In systems where a common molten mass reaction medium is used in a series of successive zones, the medium requirements of successive zones may differ and the requirements of individual zones may fluctuate, thus making it desirable to be able to independently control the flow of the common reaction medium through the different zones.

OBJECTS OF THE INVENTION

Accordingly, it is an object of the present invention to provide a method and apparatus for controlling the flow of a molten mass reaction medium through a reaction zone.

Another object of the present invention is to provide a method and apparatus which enables independent control of the flow of a molten mass reaction medium through different portions of a multi-zone reaction system.

A further object of the present invention is to provide a method and apparatus for controlling the flow of a molten mass reaction medium from a common source to a plurality of different reaction zones.

Yet another object of the present invention is to provide a method and apparatus for controlling the flow of a molten mass reaction medium from a plurality of sources into a single reaction zone.

A further object of the present invention is to provide a method and apparatus for controllably recycling a portion of a molten mass reaction medium withdrawn from a reaction zone back to one or more specific sections of that reaction zone.

Further, it is an object of the present invention to provide a method and apparatus for controlling the flow of a molten mass reaction medium which does not require the use of valves, pumps or other devices incorporating moving parts in direct contact with the molten mass reaction medium.

It is also an object of the present invention to provide a method and apparatus for controlling the flow of a molten mass reaction medium in which the flow of the reaction medium may be controlled independently of the flow of reactants into the system.

Another object of the present invention is to provide a method and apparatus for controlling the flow of a molten mass reaction medium which facilitates rapid, precise control of the reaction conditions in the reaction zone.

An additional object of the present invention is to provide a method and apparatus for controlling the flow of a molten mass reaction medium between one or more transport reaction zones and one or more fixed pool reaction zones.

A still further object of the present invention is to provide a method and apparatus for independently controlling the flow of two or more different molten mass reaction media through a common reaction system.

SUMMARY OF THE INVENTION

These and other objects of the invention are achieved by providing a method of controlling the flow of a molten mass reaction medium through a supply conduit to a reaction zone comprising introducing a control gas into said supply conduit and proportioning the flow of control gas to the desired flow of the molten medium.

The objects of the invention are also achieved by providing apparatus for carrying out chemical reactions in a molten mass reaction medium, said apparatus comprising a reaction zone, supply conduit means for supplying a molten mass reaction medium to said zone, and means for controllably introducing a control gas into said conduit means for regulating the flow of said molten mass medium therethrough.

In a further aspect of the invention, the objects of the invention are achieved by providing a method of apportioning the flow of a molten mass reaction medium from a plurality of sources into a reaction zone, said reaction zone being provided with an individual supply conduit leading from each source of molten medium to said reaction zone, said method comprising introducing a control gas into at least one of said individual supply conduits and regulating the flow of control gas to regulate the proportion of molten medium entering said reaction zone through said one conduit, and by providing apparatus for carrying out a chemical reaction in a molten reaction medium comprising a reaction zone, a first supply conduit means for supplying molten reaction medium from a first source to said reaction zone, a second supply conduit means for supplying molten reaction medium from a second source to said reaction zone, and means for controllably introducing a control gas into at least one of said first and second supply conduit means for regulating the flow of molten medium therethrough.

In another aspect of the invention, the objects are achieved by providing a method of apportioning the flow of a molten salt reaction medium among a plurality of reaction zones, each zone being served by an individual supply conduit for said molten medium, said method comprising introducing a control gas into at least one of said individual supply conduits and regulating the flow of control gas to control the proportion of molten mass medium flowing into the reaction zone through said one conduit, and by providing apparatus for carrying out a chemical reaction in a molten mass reaction medium, said apparatus comprising first and second reaction zones, first supply conduit means for supplying molten reaction medium from a source to said first reaction zone, second supply conduit means for supplying molten reaction medium from said source to said second reaction zone, and means for controllably introducing a control gas into at least one of said first and second supply conduit means for regulating the flow of molten reaction medium therethrough.

In a further preferred aspect, the objects of the invention are achieved by providing a method for independently controlling the flow of a molten mass reaction medium through a series of successive reaction zones, said method comprising recycling a portion of the molten medium exiting one of said reaction zones through a recycle conduit means to said one reaction zone, introducing a control gas into said recycle conduit means, and regulating the flow of said control gas to control the amount of recycle molten medium passing through said one reaction zone independently of the flow of molten medium through the remaining reaction zones in said series, and by providing apparatus for carrying out a chemical reaction in a molten reaction medium, said apparatus comprising a reaction zone, supply conduit means for supplying a molten reaction medium to said reaction zone, means for withdrawing a mixture of molten reaction medium and reaction product from said reaction zone, means for separating said molten reaction medium from said reaction product, recycle conduit means for recycling a portion of said separated molten reaction medium to said reaction zone, and means for controllably introducing a control gas into at least one of said supply conduit means and said recycle conduit means for regulating the flow of molten mass reaction medium entering said reactor therethrough.

As used herein the term "supply conduit" refers to a containment volume through which a molten mass reaction medium flows, entering at a lower section and exiting from the uppermost section, and wherein provision is made for introduction of a control gas into a lower section of said volume in such a manner as to increase the flow rate of molten mass reaction medium through said volume in proportion to the amount of gas which is introduced by exerting a gas lift effect on the molten mass reaction medium. The "control gas" may be a reactant gas, an inert diluent or even a non-gaseous feedstock which vaporizes at the temperature of the molten mass reaction medium, and may be added continuously or intermittently. The supply conduit may take any number of configurations, the most preferred being a vertically oriented, elongated cylindrical shape. The openings into or out of the supply conduit may be larger or smaller than the conduit.

The process and apparatus of the present invention may be used in conjunction with any chemical reaction carried out in a molten mass reaction medium. Examples of such reactions include cracking, oxidation, partial oxidation, gasification, methanation, polymerization, halogenation, dealkylation, desulfurization, reforming, isomerization, dehydrogenation, oxidative dehydrogenation. Catalytic reactions may be effected in the presence of suitable catalysts. If desired, more than one reaction may be carried out simultaneously in the same reaction zone or in different reaction zones. Additional types of reactions which can be conducted in a molten mass reaction medium are described in *Advances in Molten Salt Chemistry*, Vol. 3, Plenum Press, New York (1975).

The process and apparatus of the invention are applicable to various types of molten mass reaction media. Typically, the molten medium will comprise a molten metal, a molten metal salt, a molten metal oxide, a mixture of molten metal and molten metal salt or oxide, a mixture of molten metals, a mixture of molten metal salts or a mixture of molten metal oxides. The molten mass reaction medium should be stable throughout the entire temperature range of anticipated operation of the melt. Preferred materials for use as the molten mass medium include the alkali metals and alkali metal salts or oxides, including the carbonates, hydroxides, nitrates, sulfides, chlorides and oxides thereof. Mixtures of alkali metals or of alkali metal salts or of alkali metals and alkali metal salts may be utilized to good advantage. The carbonates, hydroxides, sulfides, sulfites and sulfates of lithium, sodium and/or potassium and mixtures thereof are particularly preferred. Use of carbonate salts may be particularly advantageous if a sulfur-containing material is reacted in the molten mass medium, because the carbonate melt may react with sulfurous by-products, causing them to be chemically combined into the melt instead of being released with the product gases, thereby reducing contamination of the products and/or the environment.

An especially preferred molten mass medium for use in reactions such as cracking a carbonaceous feedstock (e.g., asphalt) is a eutectic mixture of alkali metal carbonate salts. The eutectic mixture may be binary, ternary, quaternary, etc. The use of eutectic mixtures facilitates closer control of the melt temperature of the molten mass reaction medium.

The method and apparatus of the invention have shown particular suitability for cracking of hydrocarbon feedstocks, for gasification of carbonaceous materials or for chlorination of hydrocarbons.

The reactants to be introduced into the molten mass medium will, of course, depend upon the particular reaction which is being run. Gases, liquids and/or finely divided solid materials may be introduced as reactants. Not infrequently, reactants which are nominally liquids or solids at room temperature will be converted at the temperatures prevailing in the melt to gaseous form. Exemplary gaseous reactants include oxygen, water vapor, hydrogen, hydrocarbon gases and others. The types of reactant material which may be introduced into a molten mass medium are extremely broad. For instance, in a partial oxidation-gasification type reaction, carbonaceous feedstocks such as asphalt, cycle oil, shale oil, slurry oil, distillation and flash residues, solvent extraction residues, aromatic tars, crude oil, crude bottoms, pitch, tar sand oil, coal, coal tar, natural tar, fuel oil, hydrocarbon-containing polymers, naphtha, natural gas, refinery gas, kerosene, shredded rubber (e.g., shredded automobile tires), and/or used crankcase oil might suitably be utilized as reactants.

The control gas introduced into the molten reaction medium in the process and apparatus of the present invention also may be selected from a wide variety of materials. It may be a reactive gas which will serve as a reactant in the reaction zone, such as oxygen or steam. Alternatively, the control gas may be an inert gas, such as nitrogen or helium in most cases. Hydrogen may be utilized either as a reactive gas or as an inert gas depending on the reaction system. It is contemplated that gaseous mixtures may be utilized, e.g., air or refinery gas. It is also contemplated that the substance utilized as the control gas may be a liquid at room temperature which volatizes at melt temperatures, such as mixtures of alkanes, e.g., hexane. In reactions where the presence of oxygen is not disadvantageous, air is a preferred control gas because of its ready availability. Other gases which may be used as the control gas include carbon dioxide, steam, methane, and the like.

Although reactant gas or feedstock material may be used as all or part of the control gas, for controllability of the system, not all of the reactant or feedstock may be used as the control gas and provision must be made for independent introduction of part of the reactant or feedstock to the reaction zone.

The temperature of the molten mass reaction medium may vary over a wide range depending upon the character of the materials from which it is constituted. For example, salts which are molten in the range between about 200° C. and about 2500° C. may be utilized. In the cracking of carbonaceous feedstocks the temperature of the molten mass reaction medium will ordinarily be selected in the range between about 600° C. and about 850° C. In the partial oxidation or gasification of hydrocarbonaceous feedstocks or of coke to produce a low or medium BTU fuel gas, melt temperatures ranging from about 800° to about 1200° C. are suitable. Precise temperatures for any given situation will, of course, depend upon the nature of the desired reaction. For example, the reaction of gaseous hydrogen sulfide with alkali metal carbonates to produce alkali metal sulfides, carbon dioxide and water is favored at elevated temperatures while the reverse reaction of alkali metal sulfides with carbon dioixide and water to produce carbonates and gaseous hydrogen sulfide proceeds more readily at lower temperatures. Selection of the appropriate temperature for a desired reaction is within the ability of a person skilled in the art.

Similarly, reaction pressures may vary over a wide range. Pressures may be sub-atmospheric; ranging as low as ½ atmosphere or less, or they may be elevated up to 20 atmospheres or more. Generally, to simplify construction and operation of the reaction systems, pressures at or near atmospheric pressure are utilized. The actual and relative pressures at given points within a molten mass reaction medium installation will, of course, vary depending upon the hydrostatiforces and hydraulic properties of the molten mass reaction medium.

As noted hereinbefore, one of the important advantages of the method and apparatus of the present invention lies in the ability to control the rate at which molten mass reaction medium is supplied to a reaction zone. By increasing the rate at which a carrier gas is introduced into the molten medium in the supply conduit, the flow rate of the molten medium may be accelerated, which in turn produces a reduction in the transit time of the medium as it passes through the reactor. Conversely, a decrease in the amount of carrier fluid introduced into the supply conduit reduces the flow of molten medium, and increases the transit time of the medium passing through the reactor. For example, in the cracking of asphalt to produce distillable liquid hydrocarbons, a carrier gas is introduced at a rate sufficient to maintain a superficial velocity of the multi-phase mixture through the reaction zone of about 10 to about 100 feet per second, preferably about 20 to 35 feet per second.

The process and apparatus of the present invention may be used for catalytic reactions wherein a catalyst material is incorporated in the molten mass reaction medium. Examples of catalytic materials which may be incorporated into the medium include chromium, cobalt, nickel, iron, platinum and catalytically active salts including oxides, halides, sulfides, sulfates, carbonates, etc., silica-alumina catalysts, chromia-alumina catalyst, boron, boron oxides, peroxides, hydrogen halides and other catalyst materials. If a catalyst is used, it will usually be present in minor proportion, generally constituting less than about 25% by weight of the molten mass medium, preferably less than 10% by weight, and most preferably less than 5% by weight.

The process and apparatus of the invention are particularly applicable to transport molten mass media reaction systems, i.e., systems in which the molten reaction medium is transported through the reaction zone along with reactants. It is particularly preferred to utilize the process and apparatus of the invention in a system operated in the froth flow transport mode. The term "froth flow transport mode" refers to a system in which gaseous reactants and/or inert diluents are introduced into the molten mass medium at a sufficient rate that a turbulent, multi-phase mixture is produced in which the gaseous components of the mixture exert a gas-lift effect upon the molten medium and thereby transport the molten medium through the reaction zone. The reaction zone is ordinarily constituted as a vertically elongated zone with the molten mass medium and the reactants introduced at the lower end of the zone where they combine in a turbulent fashion to produce a multi-phase mixture which then rises through the reaction zone. Sufficient turbulence should be maintained so that an intimate admixture of reactant and molten medium is produced. Ordinarily this is achieved by introducing the reactants into the molten mass medium at high velocity. Molten mass medium and reactants/products flow through the reaction zone in a co-current relation.

The multi-phase mixture is withdrawn from the upper end of the reaction zone and transferred to a separating zone where the gaseous materials, including most of the desired products, are separated from the liquid phase which consists predominantly of the molten mass medium plus small amounts of carbonaceous residue, ash and possibly sulfur compounds.

Preferably, the molten mass medium and the reactant materials are introduced co-currently into a vertically elongated reaction zone to produce a multiphase gas/liquid mixture having a hydraulic flow pattern of sufficient turbulence to represent the froth flow or more turbulent type of hydraulic transport flow. Material velocities above the minimum amount necessary to achieve such flow may be utilized and, in certain situations, are highly desirable to reduce the contact time between the reactants and the molten mass medium and or to increase the throughput through a given reaction zone. As a matter of good engineering practice, the flow rate of reactants, diluents (if any) and molten mass medium should be adjusted to provide an optimum balance between maximum product yields and minimum operating costs. The resulting hydraulic transport of molten mass reaction medium and reactants/products through the reaction zone may be such that it corresponds to an annular mode of hydraulic transport, a mist hydraulic transport mode or any other suitable hydraulic transport condition in which an intimate multi-phase gas/liquid admixture with the molten mass reaction medium is produced and sufficient transport forces are generated to establish and maintain the circulation of molten mass reaction medium through the reaction zone.

The optimum degree of turbulence for each molten mass reaction zone will depend upon the parameters of the particular process being carried out. However, it has been determined that, for most systems, the preferred degree of turbulence generally lies in the range designated the "froth flow" range as described and set forth in Anderson, R. J. and Russell, T. W. F., *Chemical Engineering*, Dec. 6, 1964. Certain flow conditions characterized by those authors as "slug flow" may also prove suitable in the process and apparatus of the presently claimed invention in that the desired intimate admixture and transport effects are produced. The gas-lift effect or air-lift effect which contributes to the transport of the molten medium multi-phase mixture through the reaction zone is believed, at least in part, to be a result of the effective reduction in average density resulting from the introduction of a gaseous phase into the medium.

BRIEF DESCRIPTION OF THE DRAWINGS

The invention will be explained in further detail with reference to the accompanying drawings wherein.

DETAILED DESCRIPTION OF THE PREFERRED EMBODIMENTS

Figure 1:
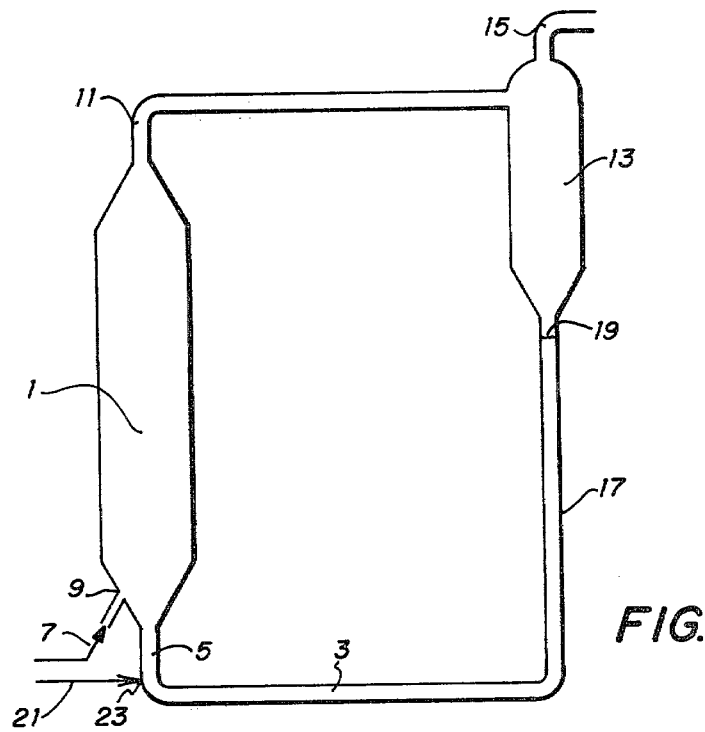
FIG. 1 is a schematic representation of a single reaction zone installation incorporating the features of the invention.

FIG. 1 is a schematic representation of a system for conducting chemical reactions in a molten mass medium comprising a single, elongated, vertically-oriented reaction zone 1. The lower end of vertically-oriented zone 1 is connected to a molten medium supply conduit 3 via a vertical supply conduit section 5. A reactant material, such as a hydrocarbon feedstock, is introduced through reactant supply line 7 through inlet 9 near the base of reaction zone 1. The resulting multi-phase mixture is transported upwardly through reaction zone 1 and is withdrawn from the reaction zone through discharge conduit 11 which leads to means for separating the gaseous and liquid phases of the mixture. In the illustrated embodiment, the separating means comprises a cyclone separator 13. Gaseous materials, including the desired gaseous reaction products, are withdrawn from the top of cyclone 13 through outlet line 15 and conveyed to a desired location for further processing or separation. The separated liquid phase of the reaction mixture leaves cyclone separator 13 via molten medium return line 17 which connects with molten medium supply line 3. A supply of molten mass reaction medium accumulates in return line 17, supply line 3 and vertical supply conduit section 5. The interfacial level between the accumulated molten medium and the gaseous phase within the system is designated by reference numeral 19. It is understood that the liquid interface 19 may be located in return line 17 or it may be located in cyclone 13.

As a result of the hydrostatic pressure of the column of molten mass medium in return line 17 and the effect of the introduction of reactants through line 7 and inlet 9, a continuous circulation of molten mass reaction medium through the system is established. Within limits, the circulation may be controlled by increasing or decreasing the inventory of molten medium in the system, thereby raising or lowering interface 19 and increasing or decreasing the hydrostatic pressure produced by the column of medium.

Further control the molten medium flow is achieved by introducing a control gas through line 21 and inlet 23 near the lower end of vertical supply conduit section 5. The control gas, which typically is steam or air, mixes with the molten mass reaction medium to produce a multi-phase gas/liquid mixture, the effective density of which is considerably less than the density of the molten medium per se. The control gas exerts a gas-lift effect on the molten medium and increases the flow of the medium through conduit 5. The effect of the control gas may be concentrated due to the reduced diameter of supply conduit section 5 in comparison with the diameter of the reaction zone 1. In consequence of the gas lift effect exerted by the control gas, the circulation of molten mass medium through the reaction system is accelerated. Thus, by selectively increasing or decreasing the amount and thus the velocity of the control gas, the circulation of molten mass reaction medium may be correspondingly increased or decreased. Importantly, such control may be effected during continuous operation of the system. Moreover, no valves or other moving parts are placed in contact with the molten medium.

The supply conduit may function as part of the overall reaction zone for selective reaction. For example, in gasification of carbonaceous material by both oxidation with molecular oxygen and by the water-gas shift reaction in a common zone wherein the carbonaceous material is already present in the molten mass reaction medium in the form of coke residues from other reactions conducted in the medium, molecular oxygen introduced as a control gas in the supply conduit will selectively react with some of the carbonaceous material prior to entering the reaction zone proper where the water or steam for the water gas shift reaction is introduced.

Figure 2:
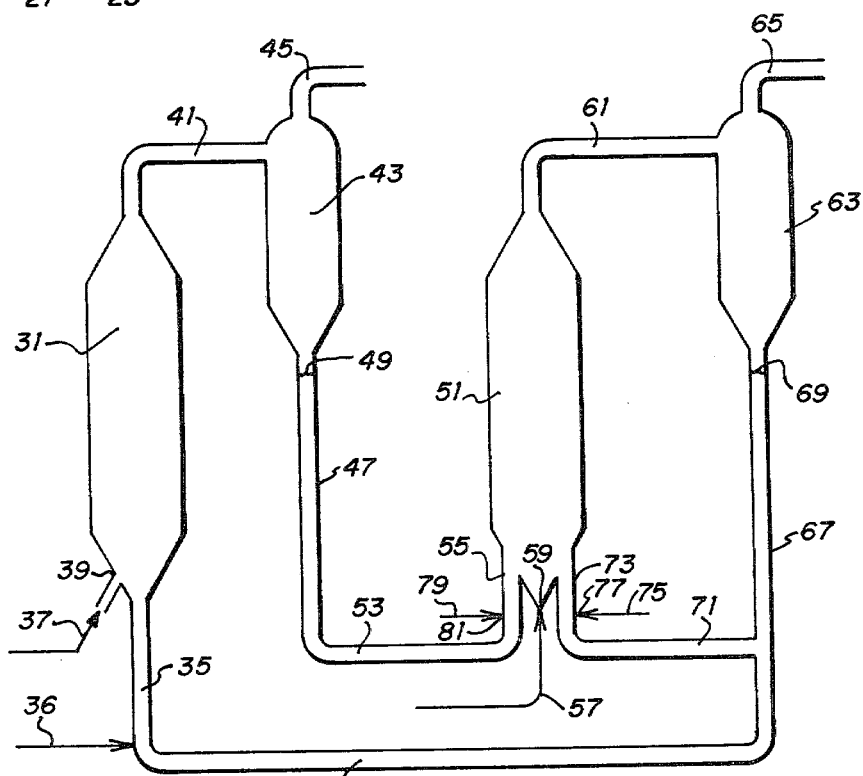
FIG. 2 is a schematic representation of one type of dual zone molten mass medium reaction system in which the flow of molten mass medium through one of the zones may be controlled independent of the flow through the other zone.

FIG. 2 is a schematic illustration of a two-zone molten mass medium reaction system in which the zones are connected in series so that two different reactions may be carried out successively in the respective zones. Apparatus of this type is particularly adapted for carrying out processes such as thermal cracking of heavy hydrocarbon feedstocks and oxidation or partial oxidation of the resulting carbonaceous residues.

A molten mass reaction medium enters a vertically-oriented, elongated reaction zone 31 from a molten medium supply line 33 through a vertical supply conduit section 35. One or more feedstocks are introduced into the molten mass medium through line 37 and inlet 39 at the base of reaction 31. The reactants mix with the molten medium with sufficient turbulence and velocity to produce an intimately mixed multi-phase admixture. A gas-lift effect is exerted so that the resulting multi-phase mixture is transported upwardly through reaction zone 31 and out of the top of the zone through discharge conduit 41 to separating means comprising a cyclone separator 43. The multi-phase mixture is divided by the cyclone into a gaseous product stream which exits through outlet conduit 45 and a liquid phase comprising principally the molten mass reaction medium which passes from separator 43 through conduit 47, the surface of the accumulated molten medium in conduit 47 being indicated at 49. The molten medium from conduit 47 passes through line 53 and vertically-oriented supply conduit 55 into reaction zone 51. A feedstock is also introduced into reaction zone 51 through conduit 57 and inlet 59 at the base of reaction zone 51. The feedstock is intimately mixed with the molten medium to form a multi-phase liquid/gas mixture which is transported via a gas-lift effect through the reaction zone. The multi-phase mixture is withdrawn from the top of reaction zone 51 through discharge conduit 61 to cyclone 63 where it is separated into gaseous and liquid fractions. The gaseous products are withdrawn from the cyclone through outlet conduit 65, and the liquid products exit the cyclone through conduit 67, the surface of the accumulated molten medium in conduit 67 being indicated at 69. Conduit 67 connects with molten medium supply conduit 33 so that the molten medium may be returned to reactor 31. Molten medium circulates through the respective reaction zones as a result of the hydrostatic pressure of the molten medium accumulated in return lines 47 and 67 and the gas-lift effect resulting from the introduction of feedstocks and/or diluents through lines 37 and 57.

As the flow of molten reaction medium through the system has been described thus far, the medium moves sequentially through the two reaction zones. In the absence of further provisions, the flow of medium through the two zones would necessarily have to be approximately equal with temporary variations resulting in increases or decreases of the supply of molten medium in conduit 47 and/or conduit 67. However, since different reactions will ordinarily be carried out in zones 31 an 51, it is not infrequent that the achievement of optimum reaction conditions in both of the reaction zones will require that the flow of molten medium through the two zones be different, i.e., that the flow rate of medium through one zone be significantly greater than the flow rate of medium through the other zone. Accordingly, the illustrated system is provided with a recycle line 71 and a vertical supply conduit 73 communicating between return conduit 67 and reactor 51. A portion of the molten mass reaction medium from line 67 may be recycled through line 71 and vertical supply conduit 73 to reaction zone 51. Two independent circuits for the flow of molten medium through reactor 51 are thus established. An increased flow of molten medium may thereby be provided through reaction zone 51 without increasing the flow of molten medium through reaction zone 31.

It is necessary to be able to control the amount of molten medium which flows through each of the circuits in the system. In order to achieve control, a control gas may be introduced near the base of vertical supply conduit 73 through line 75 and inlet 77. Similarly, a control gas may be introduced into vertical supply conduit 55 through line 79 and inlet 81. The control gas introduced through line 75 and inlet 77 into vertical supply conduit 73 exerts a gas-lift effect on the molten mass medium in the supply conduit and thereby increases the circulation of molten medium therethrough into reaction zone 51. By increasing or decreasing the flow of control gas through conduit 75, the flow of molten medium through vertical supply conduit 73 may be regulated. A similar result is obtained as a result of the introduction of control gas through conduit 79 and inlet 81. A gas-lift effect is exerted on the molten mass medium in vertical supply conduit 55 thereby increasing the flow of molten mass medium therethrough into the reaction zone 51. By increasing or decreasing the flow of control gas through conduit 79, the flow of molten mass medium through vertical supply conduit 55 into reaction zone 51 may be correspondingly increased or decreased.

By increasing and/or decreasing the flow of control gas through conduits 75 and 79, the amounts and proportions of molten mass medium entering reaction zone 51 through vertical supply conduits 73 and 55 may thus be regulated. Under normal circumstances a flow of control gas would be maintained through only one or the other of supply conduits 73 and 55 except as necessary to keep the openings cleared of the molten mass reaction medium. The total amount of molten mass medium entering reaction zone 51 may be increased by increasing the flow of control gas through both conduits 75 and 79 and decreased in the same manner by decreasing the flow of control gas through both conduits. For short term adjustment, the proportion of molten mass medium recirculated to reaction zone 51 compared to the amount entering from reaction zone 31 may be increased by increasing the flow of control gas through line 75. The opposite effect will result, of course, from a decrease in the flow of control gas through line 75. Namely, an increase in the proportion of molten mass medium entering reactor 51 from reaction zone 31.

For longer term adjustments of the relative flow rates, the heights of interfacial levels 49 and 69 of the molten medium in return lines 47 and 67 should be adjusted upwardly or downwardly to respectively increase or decrease the flow of molten medium from reaction zone 31 through line 53 to reaction zone 51 or back from reaction zone 51 through line 33 to reaction zone 31. In this way, a gradation of control can be achieved in the flow of molten mass medium through both circuits of the system.

Under some circumstances, the flow of control gas to either supply conduit section 55 or recycle conduit section 73 may be nil. It may even be desirable to dispense with the control gas supply line and inlet on one of the conduits in some installations. However, for maximum flexibility of control of the flow of the molten mass, it is proposed that provision be made for introducing carrier gas into both lines.

It will be noted that the figure illustrates an optional control feature in which line 75 enters vertical supply conduit 73 at a lower level than line 79 enters vertical supply conduit 55. As a result of this difference in heights, further control of the proportions of molten mass medium passing through the two circuits of the system is possible. Generally speaking, the greater the height through which a control gas acts upon the molten medium, the greater the resulting effect. Thus, if equal amounts of control gas are introduced through line 75 into supply conduit 73 and through line 79 into vertical supply conduit 55, assuming all other factors such as conduit diameter, medium viscosity and the heights of interfacial levels 49 and 69 are substantially identical, a greater increase in the flow of molten medium will occur through recycle conduit 71 than through molten medium conduit 53. It is thus possible to achieve different rates of flow of molten medium through the different circuits of the system while having both control gas lines 75 and 79 connected to a common source of control gas.

The illustrated system is particularly applicable to reactions such as the cracking of heavy hydrocarbonaceous feedstocks such as asphalt and subsequent partial oxidation of the carbonaceous residue which accumulates in the molten reaction medium during the cracking operation to produce a combustible fuel gas. In such a case, asphalt is introduced into reaction zone 31 through line 37 and inlet 39. The products of the cracking reaction are withdrawn through line 45 for further separation or reaction and the carbonaceous residue containing molten medium passes through conduit sections 47, 53 and 55 to reaction zone 51 where it is mixed with an oxygen-containing gas, such as air and/or water vapor, entering through line 57. The carbonaceous residue is oxidized by the oxygen-containing gas in reaction zone 51. In order to produce a useful fuel gas, it is necessary that the oxidation merely be partial, i.e., that the carbonaceous residue in the molten reaction medium be oxidzed substantially only to carbon monoxide and not to carbon dioxide. In order to prevent over-oxidation of the carbonaceous residue, it may be desirable to adjust the proportions of oxygen and water vapor introduced into the oxidation zone.

It may be desirable to maintain a difference in pressure between reaction zone 31 and reaction zone 51. This may be achieved by adjusting the relative elevations of interfaces 49 and 69. The adjustment of the relative heights of the interfaces may be accomplished by controlling the pressures of the product gas streams exiting through conduits 45 and 65.

Figure 3:
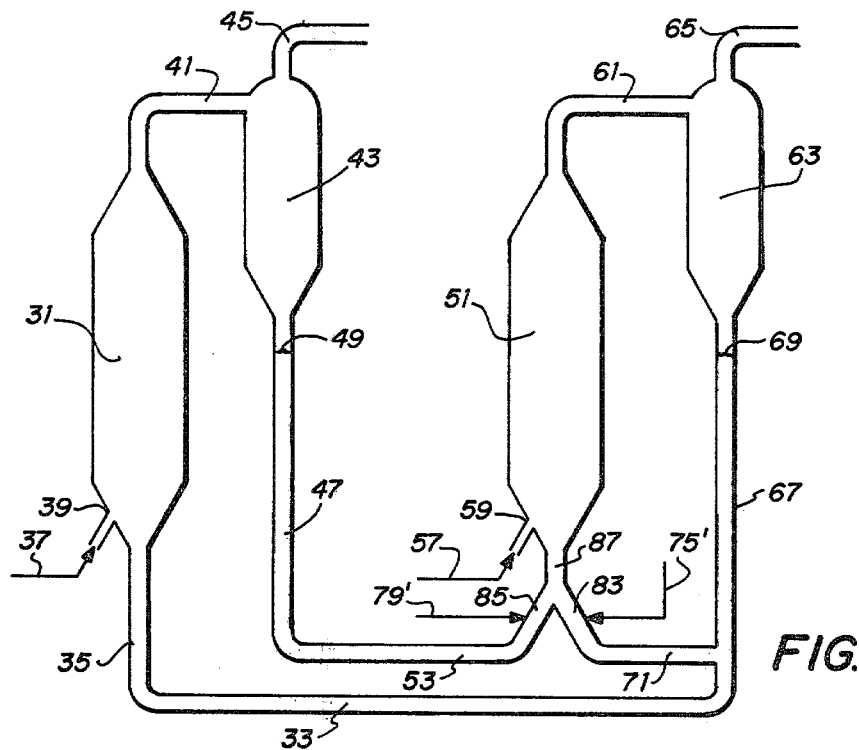
FIG. 3 is a schematic representation of an alternate embodiment for independent control of the flow of molten mass medium through a pair of zones connected in series.

FIG. 3 illustrates an alternate way of achieving independent control of the flow of molten reaction medium through a pair of reaction zones connected in series. The system illustrated in FIG. 3 is similar to that illustrated in FIG. 2 and like reference numerals have been used throughout to designate similar portions of the system. However, the system of FIG. 3 differs from that illustrated in FIG. 2 in that it does not have the two vertical molten mass medium supply conduits 55 and 73 leading to reaction zone 51. Instead, inclined supply conduits 83 and 85 are provided which connect recycle conduit 71 and molten mass conduit 53, respectively, to a common vertical conduit section 87 which in turn opens into the bottom of reaction zone 51. Of course, if desired, one supply conduit could be vertical and the other inclined. Control gas supply lines 79' and 75' are provided to introduce a control gas into inclined supply conduits 85 and 83, respectively. The operation of the apparatus illustrated in FIG. 3 is analogous to that of the system shown in FIG. 2. Control gas introduced into inclined supply conduit 85 from line 79 produces a gas-lift effect in the molten medium in the supply conduit and thereby increases the rate of flow of molten mass medium through the conduit into reaction zone 51. Similarly, control gas introduced into conduit section 83 from line 75 produces a gas-lift effect to increase the flow of molten mass medium through the conduit section into the reaction zone 51. By adjusting the flow of control gas through one or both of lines 79' and 75', the relative proportions and amounts of molten medium introduced into reaction zone 51 can be regulated.

It is thus possible according to the present invention to regulate the proportions of molten mass medium introuduced into a single reaction zone from a plurality of molten mass medium sources. Although two sources have been illustrated, with appropriate modifications the supply of molten mass medium to a reaction zone from any number of sources may be controlled.

Figure 4:
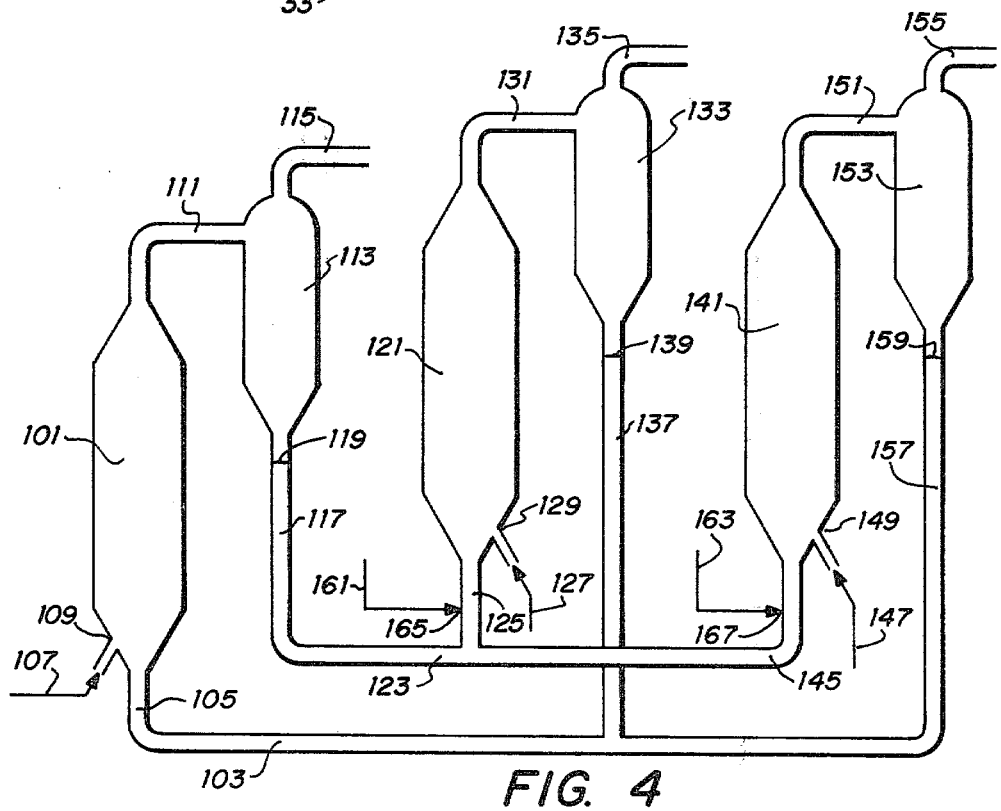
FIG. 4 is a schematic representation of a molten mass medium installation in which the circulation of molten reaction medium through a pair of parallel reaction zones is independently controlled.

FIG. 4 is a schematic representation of another molten mass medium reaction system comprising a plurality of reaction zones. The system of FIG. 4 is designed for carrying out simultaneous parallel reactions on separate portions of a molten mass medium after which the separate portions are combined and a further reaction is carried out on the combined portions.

In the illustrated arrangement, a molten mass reaction medium from a molten medium conduit 103 passes through a vertical supply conduit 105 into an elongated, vertically-oriented reaction zone 101. Simultaneously, a reactant material is introduced through line 107 and inlet 109 at the base of reaction zone 101, and the reactant and molten medium are intimately mixed to form a multi-phase mixture. The reactant material exerts a gas-lift transport effect upon the resulting multi-phase mixture which passes upwardly through the reaction zone and is withdrawn through discharge conduit 111 and transferred to a cyclone separator 113. The multi-phase mixture is separated in the cyclone to produce a gaseous product stream which exits through outlet conduit 115 and a liquid stream which descends through conduit 117. A supply of molten medium accumulates in conduit 117, the interfacial surface level of the molten medium being indicated at 119. Conduit 117 communicates with a molten medium conduit 123.

A portion of the molten mass medium in conduit 123 passes upwardly through conduit 125 into the lower portion of reaction zone 121. A reactant material is also introduced into the base of reaction zone 121 through line 127 and inlet 129. The reactant material results in sufficient velocity and turbulence to produce a multiphase gas/liquid mixture which rises through reaction zone 121 due to the gas-lift effect. The multi-phase mixture is then withdrawn from the reaction zone through discharge conduit 131 and conveyed to a separating means comprising cyclone 133 where it is separated into a gaseous product stream which exits via outlet conduit 135 and a liquid stream which exits via conduit 137; the surface of liquid medium accumulating in conduit 137 is indicated by 139.

A second portion of the molten mass medium in supply conduit 123 passes through vertical supply conduit 145 to the bottom of reaction zone 141 where it is mixed with a reactant material entering through line 147 and inlet 149 to produce a multi-phase gas/liquid admixture. As in the other reaction zones, the multi-phase mixture rises through the reaction zone due to the gas-lift effect and passes through discharge conduit 151 to cyclone 153 where the gaseous and liquid phases are separated. The gaseous phase exists through outlet conduit 155 and the liquid phase passes into conduit 157 so that a column of molten medium accumulates therein. The surface of the molten medium in conduit 157 is shown at 159. Conduits 137 and 157 connect to molten medium conduit 103 to form a continuous loop through which the molten reaction medium is circulated.

In order to apportion the flow of molten mass medium through reaction zones 121 and 141, a control gas is introduced into vertical supply conduits 125 and 145 through lines 161 and 163, respectively. The inlet from line 161 to vertical conduit section 125 is designated by reference numeral 165, and the inlet from line 163 to vertical conduit section by reference numeral 167. The control gas introduced through line 161 and inlet 165 into vertical conduit section 125 exerts a gas-lift effect on the molten mass medium therein and increases the proportion of molten mass medium which passes therethrough into reaction zone 121. Likewise, the control gas introduced through line 163 and inlet 167 into vertical conduit section 145 exerts a gas-life effect on the molten medium and increases the flow of molten medium into the reaction zone 141. By suitably adjusting the flow of control gas through lines 161 and 163, it is possible to apportion the flow of molten mass medium from line 123 between reaction zones 121 and 141 in a desired manner. Thus, according to the presently claimed invention, the flow of molten mass medium from a common source to a plurality of separate reaction zones can be controlled.

The system illustrated in FIG. 4 is useful for cracking two different hydrocarbonaceous feedstocks such as asphalt and crude oil under different conditions in a molten mass medium in separate reaction zones (121 and 141) and then regenerating the molten mass medium from the two separate cracking reactions by oxidizing accumulated carbonaceous residues in the molten mass medium in a common reaction zone (101). A system of this type would be especially useful in cracking two different feeds, one of which produces carbonaceous residue deposits in excess of the amount needed to maintain the heat balance of the cracking operation and the other of which produces less carbonaceous deposits than needed to maintain heat balanced operation.

Figure 5:
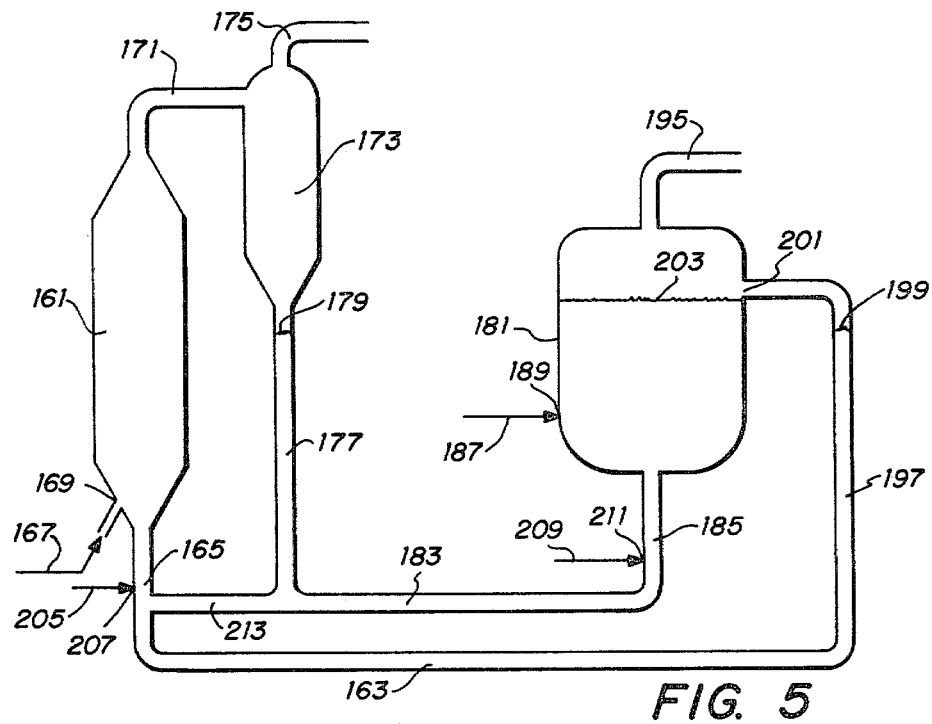
FIG. 5 is a schematic representation of a molten mass reaction medium installation in which the molten mass reaction medium is circulated between a transport reaction zone and a fixed pool reaction zone.

FIG. 5, is a schematic representation of a molten mass reaction medium installation comprising a transport reaction zone 161 and a fixed pool reaction zone 181. A molten mass reaction medium passes through conduit 163 and vertical supply conduit 165 into reaction zone 161. A feedstock material is simultaneously introduced through line 167 and inlet 169. As the feedstock is mixed with the molten mass reaction medium gases present in the system exert a gas-lift effect upon the medium, and the resultant multi-phase mixture is conveyed upwardly through reaction zone 161 and passes through outlet 171 to cyclone 173 where it is separated into a gaseous product stream which exits through discharge 175 and a liquid molten mass reaction medium stream which passes downwardly through conduit 177. The molten mass reaction medium accumulates in conduit 177 and establishes a liquid interface 179 near the base of cyclone 173. A portion of the molten mass reaction medium from conduit 177 passes through conduit 183 and vertical supply conduit 185 to a fixed pool reaction zone 181. Reactants or feedstocks are introduced into zone 181 through line 187 and inlet 189. Gaseous products of the reaction taking place in zone 181 exit the molten mass reaction medium throuh interface 203 and are conveyed away from reaction zone 181 through outlet 195. Some of the molten mass reaction medium is discharged from zone 181 through outlet 201 to line 197 where it accumulates establishing an interfacial level 199. Interfacial level 199 may also be the same as level 203 inside reactor 181. Return line 197 connects with conduit 163 through which the molten mass reaction medium passes on its way back to supply conduit 165 and reaction zone 161.

In order to enable the molten mass reaction medium to circulate through reaction zone 161 independently of the flow through reaction zone 181, a recycle line 213 is provided communicating between return conduit 177 and supply conduit 165. A portion of the molten mass reaction medium from return conduit 177 passes through recycle 213 back to supply conduit 165 and reaction zone 161 rather than passing through line 183, supply conduit 185 and reaction zone 181. Thus, the circulation of molten mass reaction medium through reaction zone 161 may be independent of the flow of molten mass reaction medium to reaction zone 181.

In order to control the flow of molten mass reaction medium into reaction zone 181, control gas is introduced through line 209 and inlet 211. As molten medium flows faster or slower into reactor zone 181, the return of molten medium via conduit 197 back into reaction zone 161 to maintain the inventory changes accordingly. The flow of medium from conduit 177 through conduit 183 into reaction zone 181 is thus controlled. This facilitates the control of the flow of molten medium between the two reaction zones 181 and 161 and consequently also controls the basic flow of molten mass medium into reaction zone 161. A control gas is introduced into supply conduit 165 through line 205 and inlet 207 to facilitate increasing or decreasing the total flow of molten mass medium into reaction zone 161.

Molten mass medium is routed to supply conduit 165 from two sources, conduit 163 and conduit 213. Alternatively, these two sources of molten mass medium could lead to independent supply conduits and sources of control gas. Either conduit 163 or conduit 213 could also be lead directly to reaction zone 161 without an intervening supply conduit.

The installation of FIG. 5 is particularly suited for gasification of a carbonaceous feed such as powdered coal by partial oxidation to produce a low or medium BTU fuel gas. The partial oxidation is conduced in reaction zone 161 by introducing the carbonaceous feed and a gas containing a mixture of molecular oxygen and water vapor through line 167 and inlet 169 into the molten mass reaction medium. By-product materials accumulating in the molten mass reaction medium are removed from the medium in a regeneration reaction conducted in zone 181; regenerant materials being introduced through line 187 and inlet 189.

Figure 6:
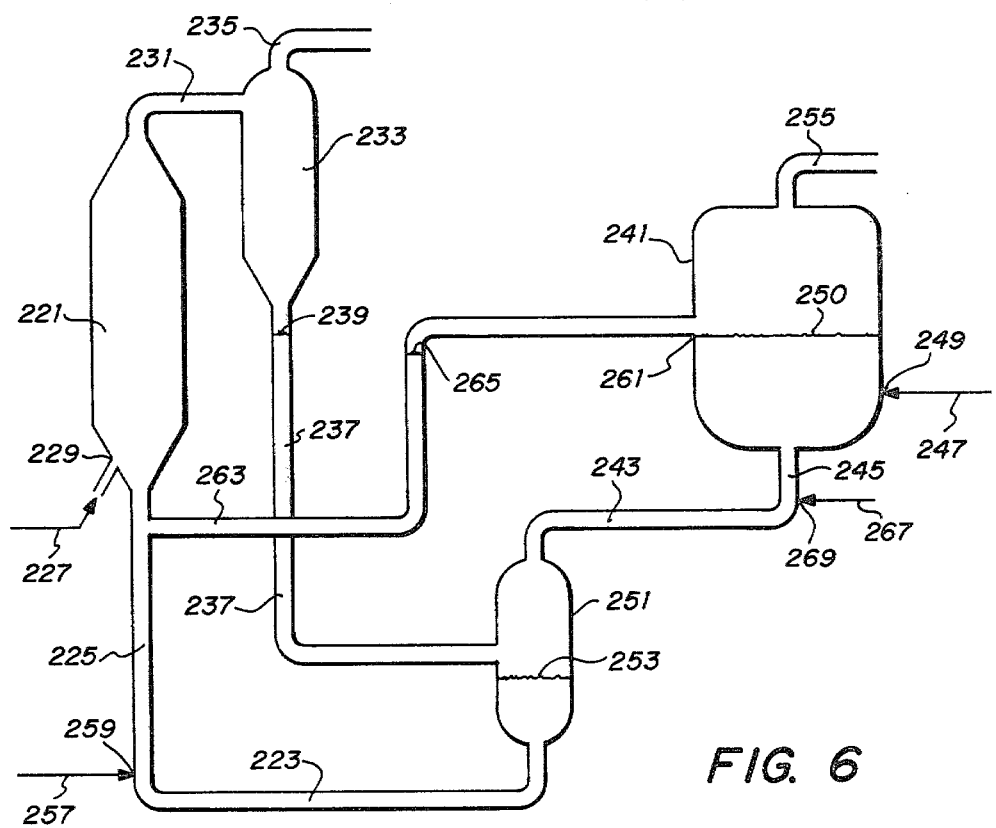
FIG. 6 is a schematic representation of a molten mass reaction medium installation utilizing two different, immiscible, independently controllable molten mass reaction media.

FIG. 6 is a schematic representation of a molten mass medium reaction installation designed to utilize a mixture of two immiscible molten mass reaction media. The feedstock material is introduced into the molten mass reaction medium mixture through line 227 and inlet 229, and gases in the resulting multi-phase mixture exert a gas-lift transport effect on the multi-phase mixture and convey it through transport reaction zone 221. The multi-phase mixture is withdrawn from reactor 221 through discharge conduits 231 to cyclone separator 233 where it is divided into a gaseous product stream and a molten mass reaction medium stream. Gaseous products are withdrawn through outlet 235. The molten mass medium passes from cyclone 233 to return line 237. Accumulating molten mass reaction medium in line 237 establishes an interfacial level designated by reference numeral 239.

The molten mass reaction medium mixture passes from return line 237 to separation vessel 251 where the lighter and heavier immiscible molten mass reaction media separate into distinct phases separated by interfacial level 253. The heavier molten mass reaction medium passes through line 223 and supply conduit 225 back to reaction zone 221. The lighter molten mass reaction medium passes from separation vessel 251 through line 243 and supply conduit 245 to fixed pool reaction zone 241. Reactants or feedstocks are introduced into reaction zone 241 via line 247 and inlet 249. Gaseous products of the reaction occurring in the molten mass reaction medium in zone 241 exit from the molten mass reaction medium through interface 250 and are withdrawn from reaction zone 241 through outlet 255. Excess molten mass reaction medium overflows through outlet 261 into line 263 where is accumulates to establish an interfacial level 265. Interfacial level 265 could also be the same as level 250 inside reaction zone 241. Line 263 connects to supply conduit 225 and thus leads back to reaction zone 221.

The basic rate of flow of the lighter molten mass reaction medium between reaction zones 221 and 241 is established according to the principles of hydraulic flow by the heights of interfacial levels 239 and 265. Supplemental control of the rate of flow of the lighter molten mass reaction medium through reaction zone 241 is achieved by introducing a control gas through line 267 and inlet 269 into supply conduit 245 where it increases the rate of flow of the lighter molten mass reaction medium by exerting a gas-lift effect on the medium. The flow of lighter molten mass reaction medium through line 263 into supply conduit 225 and thus into reaction zone 221 will also be increased due to increased flow out of reaction zone 241.

Similarly, the rate of flow of heavier molten mass reaction medium into reaction zone 221 may be adjusted by introducing a control gas through line 257 and inlet 259 into supply conduit 225 thereby increasing the rate of flow of heavier molten mass reaction medium through supply conduit 225 into reaction zone 221 by exerting a gas-lift effect on the heavier molten mass reaction medium.

If desired, the flow of heavier molten mass reaction medium can be completely stopped by shutting off the flow of control gas through line 257 and then restarted by turning the flow of control gas back on.

An example of two immiscible molten mass reaction media which might be used in such a system is a mixture of silver metal and sodium carbonate. Such mixtures of immiscible media may be useful to provide a proper heat balance for the reaction system or because one of the components exerts a catalytic effect on one of the reactions in a multi-zone reaction system but is adversely affected by another reaction conducted in a different zone. In the illustrated embodiment, the heavier silver circulates only through reaction 221 while the lighter sodium carbonate circulates through both reaction zone 221 and reaction zone 241.

The process and apparatus of the invention as shown and described have numerous advantages. They eliminate the need for troublesome valves and restrictions to control the flow of a molten reaction medium. Further, they make it possible to independently control the flow of a molten mass medium through different reaction zones of a multi-zone installation. Finally by facilitating control of the flow of molten medium, they also enable control of operating conditions which can be adjusted by adjusting the flow of molten mass medium. For example, the temperature of a reaction zone may be controlled by supplying molten medium to said zone from two distinct sources of molten medium having differing temperatures, one source of molten medium having a temperature lower than the temperature at which it is desired to supply molten medium to the reaction zone and the other source of molten medium having a temperature higher than the temperature at which it is desired to supply molten medium to the reaction zone. The flow of control gas in the supply conduits is regulated in order to control the proportions of molten medium supplied to said reaction zone from each of said respective sources. The effective temperature of the molten medium supplied to the reaction zone may thereby be controlled. Temperature adjustments may be effected during operation by merely adjusting the flow of control gas to one or both of the supply conduits. By proper design of the system it is possible to control the flows of molten mass reaction medium through the various reaction zones by introducing a control gas into only one or the other of the supply conduits associated with the respective zones; basic control of the flow rates being effected by adjusting the heights of the molten medium interfaces in the return conduits, and the introducing of control gas being used only for final adjustment of the relative flow rates.

The foregoing embodiments have been described merely to illustrate the invention and are not intended to be limited. Modifications of the disclosed embodiments may occur to persons skilled in the art without departing from the scope and spirit of the invention. For example, other types of separation devices could be used in place of the disclosed cyclones. Accordingly, the scope of the invention is to be limited solely by the scope of the appended claims.

What is claimed is:

1. A method of controlling the flow of a molten mass reaction medium through a supply conduit to a reaction zone comprising introducing a control gas into said supply conduit and apportioning the flow of control gas to the desired flow of molten medium.

2. A method of apportioning the flow of a molten mass reaction medium among a plurality of reaction zones, at least one zone being served by an individual supply conduit for said molten medium, said method comprising introducing a control gas into said supply conduit and regulating the flow of control gas to control the proportion of molten medium flowing into the reaction zone supplied by said supply conduit.

3. A method according to claim 2, wherein each zone is served by an individual supply conduit.

4. A method of apportioning the flow of a molten mass reaction medium from a plurality of sources into a reaction zone, said reaction zone being provided with a supply conduit leading from at least one source of molten medium to said reaction zone, said method comprising introducing a control gas into said supply conduit and regulating the flow of said control gas to control the proportion of molten medium entering said reaction zone through said supply conduit from the associated source.

5. A method according to claim 4, wherein an individual supply conduit is provided leading from each source of molten mass reaction medium to said reaction zone.

6. A method for independently controlling the flow of a molten mass reaction medium through a series of successive reaction zones, said method comprising recycling a portion of the molten medium exiting one of said reaction zones through a recycle supply conduit to said reaction zone, introducing a control gas into said recycle supply conduit and regulating the flow of said control gas to control the amount of said molten medium passing through said one reaction zone independently of the flow of molten medium through the remaining reaction zones in said series.

7. A method according to claim 1, 2, 4 or 6, wherein said control gas comprises an inert gas.

8. A method according to claim 7, wherein said inert gas is nitrogen.

9. A method according to claim 1, 2, 4 or 6, wherein said control gas is a reactant gas.

10. A method according to claim 9, wherein said reactant gas is air.

11. A method according to claim 9, wherein said reactant gas comprises reactive hydrocarbon material.

12. A method according to claim 9, wherein said reactant gas comprises molecular oxygen.

13. A method according to claim 5, wherein control gas is introduced into each molten medium supply conduit leading to the reaction zone and the flow of gas is apportioned among the respective conduits in order to control the rate of flow of molten medium therethrough.

14. A method according to claim 1, 2, 4 or 6, wherein said control gas introduced into said molten medium supply conduit exerts a gas-lift effect upon the molten medium in said supply conduit.

15. A method according to claim 1, 2, 4 or 6, wherein the molten medium is transported through said reaction zone as a result of the formation of a multi-phase mixture of molten medium and gaseous materials selected from the group consisting of gaseous reactants, gaseous products or gaseous diluents, said gaseous material exerting a gas-lift effect upon said molten medium.

16. A method according to claim 15, wherein the multi-phase mixture is withdrawn from the reaction zone and thereafter is separated into a gaseous phase and a liquid phase in a cyclone separator.

17. A method according to claim 1, 2, 4 or 6, wherein said molten medium is transported through said reaction zone by froth flow transport.

18. A method according to claim 1, 2, 4 or 6, wherein the operating parameters of the reaction zone are controlled by adjusting the flow of control gas in order to regulate the flow of molten medium into the reaction zone.

19. A method according to claim 18, wherein the temperature of the reaction zone is controlled by supplying molten medium to said zone from two distinct sources of molten medium having differing temperatures, one source of molten medium having a temperature lower than the temperature at which it is desired to supply molten medium to the reaction zone and the other source of molten medium having a temperature higher than the temperature at which it is desired to supply molten medium to the reaction zone, and regulating the flow of control gas in order to control the proportions of molten medium supplied to said reaction zone from each of said respective sources, thereby to control the temperature of the molten medium supplied to said reaction zone.

20. A method according to claim 1, 2, 4 or 6, wherein the flow of control gas is adjustable in order to change the amount of molten medium supplied to said reaction zone through said conduit.

21. A method according to claim 13, wherein said control gas is introduced at differing levels in said respective supply conduits.

22. A method according to claim 5, wherein a plurality of supply conduits lead to a common reactor inlet.

23. A method according to claim 1, 2, 4 or 6, wherein said molten reaction medium comprises a molten metal.

24. A method according to claim 1, 2, 4 or 6, wherein said molten reaction medium comprises a metal salt.

25. A method according to claim 1, 2, 4 or 6, wherein a reaction selected from the group consisting of cracking, oxidation, partial oxidation, gasification, methanation, polymerization, dealkylation, desulfurization, reforming, isomerization, dehydrogenation, oxidative dehydrogenation, and the catalytic versions of the foregoing, is carried out in said reaction zone.

26. A method according to claim 1, 2, 4 or 6, wherein said molten medium is selected from the group consisting of alkali metal melts, mixtures of alkali metal melts, molten alkali metal salts or oxides, mixtures of molten alkali metal salts or oxides, and mixtures of molten alkali metal and alkali metal salts or oxides.

27. A method according to claim 26, wherein said molten medium comprises an alkali metal salt selected from the group consisting of alkali metal carbonates, hydroxides, nitrates, sulfides and oxides.

28. A method according to claim 27, wherein said molten reaction medium comprises a mixture of alkali metal carbonates.

29. A method according to claim 28, wherein said alkali metal carbonate mixture comprises a eutectic mixture of sodium carbonate, lithium carbonate and potassium carbonate.

30. A method according to claim 1, 2, 4 or 6, wherein said molten medium comprises a catalytic material.

31. A method according to claim 30, wherein said catalytic material is selected from the group consisting of bismuth, rhodium, tungsten, titanium, chromium, cobalt, nickel, tin, calcium, iron, germanium, zinc, lead, magnesium, platinum, manganese, indium, cadmium, rhenium, tantalum, niobium, galium, zirconium, neodymium, cerium, lanthanum, osmium, ruthenium, iridium, and the oxides, halides, sulfides, sulfonates, sulfites, sulfates and carbonates thereof; silica-alumina catalysts, chromia-alumina catalysts, molybdena-alumina catalysts, hydrogen sulfide and mixtures thereof; glass-forming oxides selected from the group consisting of oxides of boron, vanadium, silicon, or phosphorus; hydrogen peroxide, acids such as formic acid, the hydrogen halides, sulfuric acid, ozone, borates and alkali silicates.

32. A method according to claim 1, 2, 4 or 6, wherein a carbonaceous reactant feedstock selected from the group consisting of asphalt, hydrocarbon residua produced by distillation or by distillation and solvent extraction of crude oil, fuel oil, cycle oil, slurry oil, gas oil, rubber, heavy crude oil, pitch, coal tar, cola, coal distillates, natural tar, hydrocarbon polymers, tar sand, naphtha, oil shale, crude bottoms, natural gas, refinery gas, light hydrocarbon such as ethane, propane, or butane; kerosene, shredded waste rubber, used crankcase oil, and mixtures of the foregoing.

33. A method according to claim 1, 2, 4 or 6, wherein a hydrocarbon feedstock is introduced into the molten medium.

34. A method according to cliam 33, wherein the hydrocarbon feedstock is cracked to lower molecular weight hydrocarbon products in said reaction zone.

35. A method according to claim 1, 4, or 6, wherein said reaction zone comprises a vertically-oriented, elongated reactor.

36. A method for independently controlling the flow of a molten mass reaction medium through a series of successive reaction zones, said method comprising:
  introducing molten mass reaction medium through a first supply conduit into a first reaction zone;
  withdrawing molten mass reaction medium from said first reaction zone;
  introducing a first portion of the molten mass medium withdrawn from said first reaction zone through a second supply conduit to a second reaction zone;
  withdrawing molten mass reaction medium from said second reaction zone;
  conveying molten mass reaction medium withdrawn from said second reaction zone to said first supply conduit;
  conveying a second portion of the molten mass reaction medium withdrawn from said first reaction zone through a recycle line to said first supply conduit;
  introducing a control gas into at least one of said first and second supply conduits; and
  regulating the flow of said control gas to control the amount of molten mass reaction medium passing through one of said first and second reaction zones independently of the amount of molten mass reaction medium passing through the other of said first and second reaction zones.

37. A method according to claim 36, wherein one of said first and second zones is a transport reaction zone and the other of said first and second reaction zones is a fixed pool reaction zone.

38. A method according to claim 37, wherein said first reaction zone is a transport reaction zone.

39. A method according to claim 36, wherein control gas is introduced into both of said first and second supply conduits.

40. A method according to claim 36, wherein the basic flow rates of molten mass reaction medium through said first and second reaction zones are determined by the hydraulic design of the system and the hydraulic properties of the molten mass reaction medium, and the introduction of control gas is utilized to fine tune the flow rate through at least one of said first and second reaction zones.

41. A method according to claim 36, wherein said first and second supply conduits comprise vertically-oriented, elongated, cylindrical conduits.

42. A method for controlling the rates of flow of two immiscible molten mass reaction media through a multi-zone molten mass medium reaction system wherein the two immiscible media pass in admixture through at least one reaction zone of said system and one of said immiscible media passes separately through a second reaction zone of said system, said method comprising:
  introducing an admixture of said two immiscible molten mass reaction media into a first reaction zone;
  withdrawing said admixture of immiscible molten mass reaction media from said first reaction zone;
  conveying said withdrawn admixture of immiscible molten mass reaction media to a separation zone;
  separating said immiscible molten mass reaction media in said separation zone;
  withdrawing one of said immiscible media from said separation zone and conveying it through a first supply conduit to a second reaction zone;
  withdrawing the other of said immiscible molten mass reaction media from said separation zone and returning it through a second supply conduit to said first reaction zone;
  withdrawing said one of said immiscible molten mass reaction media from said second reaction zone and returning it to said first reaction zone;
  introducing a control gas into at least one of said first and second supply conduits; and
  regulating the flow of control gas to control the relative rates of flow of the individual immiscible molten mass reaction media through said reaction system.

43. A method according to claim 42, wherein said first reaction zone comprises a transport reaction zone.

44. A method according to claim 42, wherein said second reaction zone comprises a fixed pool reaction zone.

45. A method according to claim 42, wherein a cracking reaction is effected in said first reaction zone.

46. A method according to claim 42, wherein an oxidation reaction is effected in said second reaction zone.

47. A method according to claim 42, wherein control gas is introduced into both of said first and second supply conduits.

48. A method according to cliam 42, wherein said first and second supply conduits comprise vertically-oriented, elongated, cyclindrical conduits.

49. Apparatus for carrying out chemical reactions in a molten reaction medium, said apparatus comprising:
  a reaction zone;
  supply conduit means for supplying a molten reaction medium to said reaction zone;
  means for introducing at least one reactant into said molten reaction medium in said reaction zone; and
  means for controllably introducing a control gas into said supply conduit means for regulating the flow of said molten reaction medium therethrough.

50. Apparatus according to claim 49, wherein said supply conduit means extends vertically to said reaction zone.

51. Apparatus according to claim 49, further comprising means for withdrawing a mixture of molten reaction medium and reaction product from said reaction zone and means for separating said reaction product from said molten reaction medium.

52. Apparatus according to claim 51, wherein said separating means comprises at least one cyclone separator.

53. Apparatus according to claim 49, wherein said reaction zone comprises an elongated, vertically-oriented reaction vessel.

54. Apparatus for carrying out a chemical reaction in a molten reaction medium, said apparatus comprising:
   a first reaction zone;
   first supply conduit means for supplying a molten reaction medium to said first reaction zone;
   means for withdrawing a mixture of first reaction product and molten reaction medium from said first reaction zone;
   means for separating said first reaction product from said molten reaction medium;
   a second reaction zone;
   second supply conduit means for conveying molten reaction medium from said first reaction product separating means to said second reaction zone;
   means for withdrawing a mixture of second reaction product and molten reaction medium from said second reaction zone;
   means for separating said second reaction product from said molten reaction medium;
   recycle supply conduit means for conveying a portion of the molten reaction medium from said second reaction product separating means back to said second reaction zone; and
   means for controllably introducing a control gas into at least one of said second supply conduit means and said recycle supply conduit means for regulating the flow of molten reaction medium therethrough.

55. Apparatus according to claim 54, further comprising means for controllably introducing a control gas into the other of said second supply conduit means and said recycle supply conduit means.

56. Apparatus according to claim 54, wherein said second supply conduit means and said recycle supply conduit means extend vertically to said second reaction zone.

57. Apparatus according to claim 54, wherein said first and second reaction product separating means each comprise a cyclone separator.

58. Apparatus according to claim 54, wherein said first and second reaction zones each comprise elongated, vertically-oriented reactors.

59. Apparatus for carrying out a chemical reaction in a molten mass reaction medium, said apparatus comprising:
   a reaction zone;
   supply conduit means for supplying a molten mass reaction medium to said reaction zone;
   means for withdrawing a mixture of molten mass reaction medium and reaction product from said reaction zone;
   means for separating said molten mass reaction medium from said reaction product;
   recycle supply conduit means for recycling a portion of said separated molten mass reaction medium from said separating means to said reaction zone; and
   means for controllably introducing a control gas into at least one of said supply conduit means and said recycle supply conduit means for regulating the flow of molten mass reaction medium therethrough.

60. Apparatus according to claim 59, further comprising means for controllably introducing a control gas into the other of said supply conduit means and said recycle supply conduit means.

61. Apparatus according to claim 59, wherein said supply conduit means and said recycle supply conduit means extend vertically to said reaction zone.

62. Apparatus according to claim 59, wherein said separating means comprises a cyclone separator.

63. Apparatus according to claim 59, wherein said mixture comprises a multi-phase gas/liquid mixture.

64. Apparatus according to claim 59, further comprising means for introducing at least one reactant into said molten reaction medium in said reaction zone.

65. Apparatus for carrying out a chemical reaction in a molten mass reaction medium, said apparatus comprising:
   first and second reaction zones;
   first supply conduit means for supplying molten mass reaction medium from a source to said first reaction zone;
   second supply conduit means for supplying molten mass reaction medium from said source to said second reaction zone; and
   means for controllably introducing a control gas into at least one of said first and second supply conduit means for regulating the flow of molten mass reaction medium therethrough.

66. Apparatus according to claim 65, further comprising means for controllably introducing a control gas into the other of said first and second supply conduit means.

67. Apparatus according to claim 65, wherein said first and second supply conduit means extend vertically to said first and second reaction zones respectively.

68. Apparatus according to claim 65, further comprising means for introducing at least one reactant into said molten mass reaction medium in said first reaction zone and means for introducing at least one reactant into said molten mass reaction medium in said second reaction zone.

69. Apparatus for carrying out a chemical reaction in a molten mass reaction medium, said apparatus comprising:
   a reaction zone;
   first supply conduit means for supplying molten mass reaction medium from a first source to said reaction zone;
   second supply conduit means for supplying molten mass reaction medium from a second source to said reaction zone; and
   means for controllably introducing a control gas into at least one of said first and second supply conduit means for regulating the flow of molten mass reaction medium therethrough.

70. Apparatus according to claim 69, further comprising means for controllably introducing a control gas into the other of said first and second supply conduit means.

71. Apparatus according to claim 69, wherein said second source is a molten mass reaction medium return conduit communicating between said reaction zone and said first source.

72. Apparatus according to claim 69, wherein said first and second supply conduit means extend vertically to said reaction zone.

73. Apparatus according to claim 69, further comprising means for introducing at least one reactant into said reaction zone.

74. Apparatus for carrying out a chemical reaction in a molten mass reaction medium, said apparatus comprising:
- a first reaction zone;
- first supply conduit means for supplying a molten mass reaction medium to said first reaction zone;
- means for withdrawing said molten mass reaction medium from said first reaction zone;
- a second reaction zone;
- second supply conduit means for conveying a molten mass reaction medium to said second reaction zone;
- means for conveying at least a portion of the molten mass reaction medium withdrawn from said first reaction zone to said second supply conduit means;
- means for withdrawing molten mass reaction medium from said second reaction zone;
- means for conveying said molten mass reaction medium withdrawn from said second reaction zone to said first supply conduit means;
- means for conveying a portion of the molten mass reaction medium withdrawn from said first reaction zone to said first supply conduit means; and
- means for controllably introducing a control gas into at least one of said first and second supply conduit means for regulating the flow of molten mass reaction medium therethrough.

75. Apparatus according to claim 74, wherein said first reaction zone comprises a transport reaction zone.

76. Apparatus according to claim 74, wherein said second reaction zone comprises a fixed-pool reaction zone.

77. Apparatus according to claim 75, further comprising means for separating gaseous reaction products from the molten mass reaction medium withdrawn from said first reaction zone.

78. Apparatus according to claim 74, wherein means are provided for introducing control gas into both of said first and second supply conduit means.

79. Apparatus according to claim 74, wherein said first and second supply conduit means comprise vertically-oriented, elongated, cylindrical conduits.

80. Apparatus for carrying out a chemical reaction in a mixture of immiscible molten mass reaction media, said apparatus comprising:
- a first reaction zone;
- means for separating said immiscible molten mass reaction media;
- means for withdrawing an admixture of immiscible molten mass reaction media from said first reaction zone and conveying said admixture to said separating means;
- a second reaction zone;
- means for withdrawing one of said immiscible molten mass reaction media from said separating means and conveying it to said second reaction zone;
- means for withdrawing said one of said immiscible molten mass reaction media from said second reaction zone and conveying it to said first reaction zone; and
- means for withdrawing the other of said immiscible molten mass reaction media from said separating means and conveying it to said first reaction zone.

81. Apparatus according to claim 80, wherein said means for withdrawing said one of said immiscible molten mass reaction media from said separating means and conveying it to said second reaction zone comprises a vertical supply conduit means, and means are provided for controllably introducing a control gas into said supply conduit means for regulating the flow of molten mass reaction medium therethrough.

82. Apparatus according to claim 80, wherein said means for withdrawing said other of said immiscible molten mass reaction media from said separating means and conveying it to said first reaction zone comprises a supply conduit means, and means are provided for controllably indroducing a control gas into said supply conduit means for regulating the flow of molten mass reaction medium therethrough.

83. Apparatus according to claim 81 or 82, wherein said supply conduit means comprises a vertically-oriented, elongated cylindrical conduit.

84. Apparatus according to claim 80, wherein said first reaction zone comprises a transport reaction zone.

85. Apparatus according to claim 84, further comprising means for separating gaseous reaction products from said admixture of immiscible molten mass reaction media withdrawn from said first reaction zone.

86. Apparatus according to claim 80, wherein said second reaction zone comprises a fixed-pool reaction zone.

* * * * *